Dec. 9, 1930.  B. J. PEPPER  1,784,465
THERMOSTAT
Filed Jan. 30, 1925  2 Sheets-Sheet 1
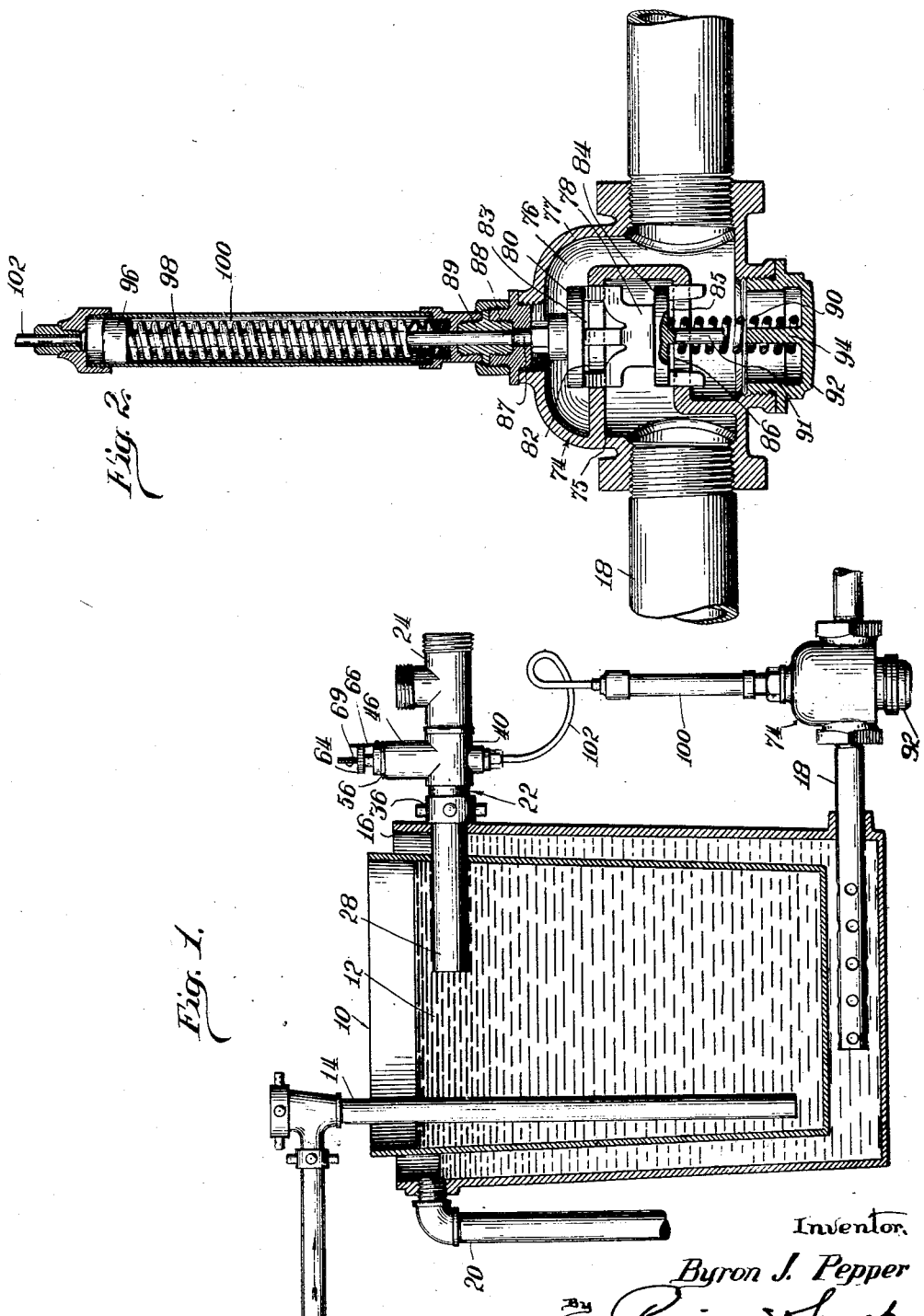
Inventor.
Byron J. Pepper
By
Attorneys.

Dec. 9, 1930.    B. J. PEPPER    1,784,465
THERMOSTAT
Filed Jan. 30, 1925    2 Sheets-Sheet 2
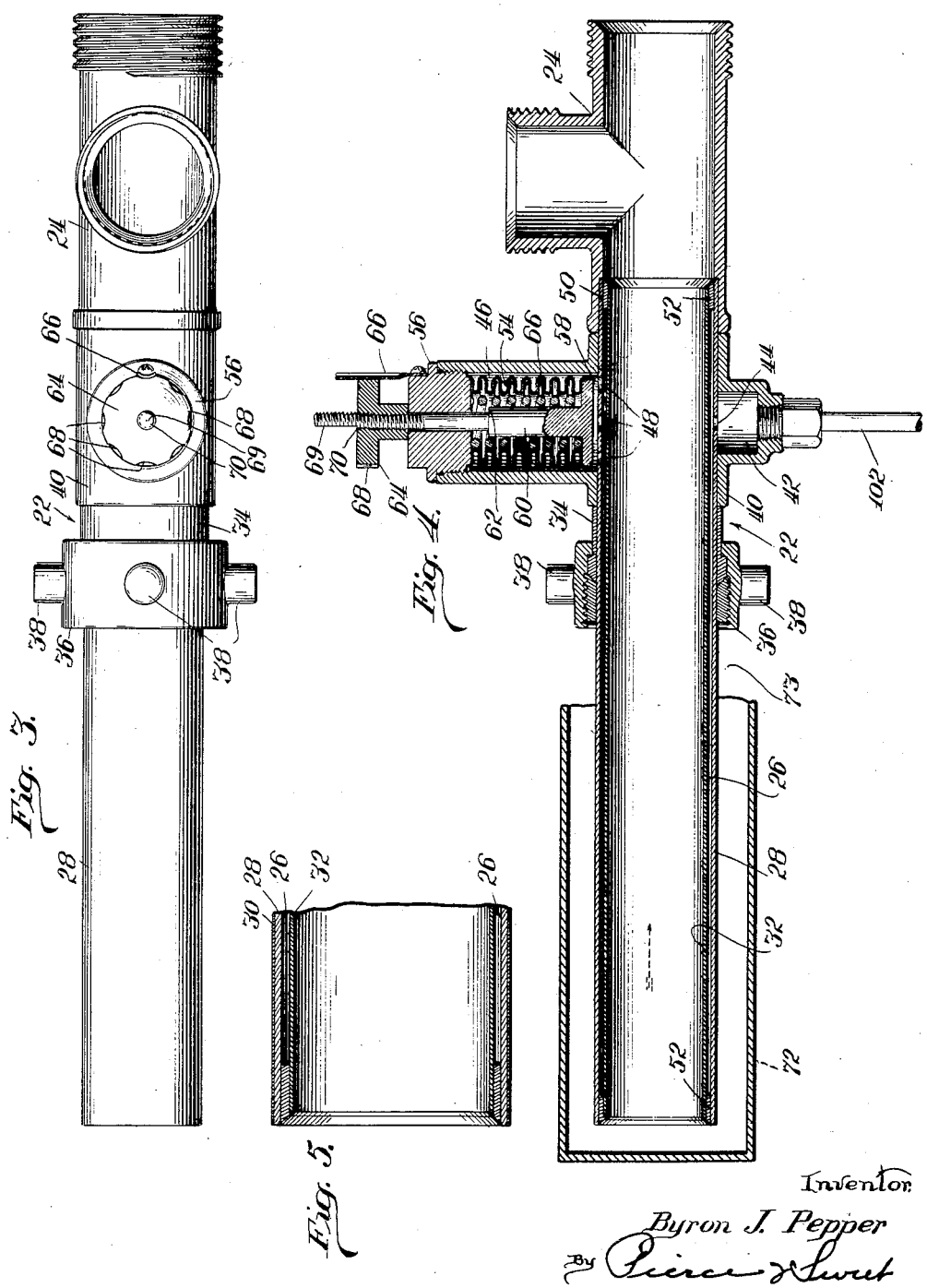
Inventor
Byron J. Pepper
By Pierce & Swet
Attorneys Patented Dec. 9, 1930

1,784,465

UNITED STATES PATENT OFFICE

BYRON J. PEPPER, OF FORT WAYNE, INDIANA

THERMOSTAT

Application filed January 30, 1925. Serial No. 5,754.

My invention relates to the art of temperature control and more specifically to a thermostatic control system of which I have illustrated an embodiment particularly adapted for precise automatic control of the heat treatment or pasteurizing of milk.

When an ordinary thermometer bulb, comprising a container filled with a liquid of different expansivity than itself, is exposed to changes in temperature, the initial incidence of any change on the bulb will change the temperature of the bulb before it can possibly change the temperature of its contents. This will produce an initial change in the indication precisely the opposite of the temperature change to which the bulb is being subjected. Where the thermometer is only being used to indicate the final temperature after prolonged immersion, this is immaterial, but where the response of the thermometer exerts a constant control on a supply of temperature changing medium for the purpose of controlling and stabilizing the temperature of material under treatment, this initial response in the wrong direction will momentarily exert a control in the wrong direction so that the system is unstable, i. e., any initial displacement from an equilibrium position tends automatically to result in further displacement in the same direction. Such a system can, and ordinarily will, oscillate continuously above and below a certain mean value. This phenomenon may be referred to in general as "hunting".

Among the functional objects and advantages of the invention may be enumerated:

First. The provision of a thermometer element with an initial response in the same direction as the momentary temperature change, resulting in a system that will not hunt and that will be dead beat in the sense that it will come to equilibrium from a condition not in equilibrium, without any final oscillation.

Second. To secure an initial response not only in the right direction but much more prompt and rapid, especially at first.

Third. To secure uniformity in response, especially in the sense that the response to any given temperature change is substantially independent of the previous temperature history of the system.

Fourth. To secure a fair measure of calibration and calibrated adjustment. In the embodiment disclosed this involves an adjustment so as to maintain an at least approximately uniform and linear relation between the disturbance and the response of the control system thereto.

Among the structural advantages of the invention, may be enumerated:

First. The compactness of the resulting structure due largely to the double function performed by the tubular thermometer bulb, which functions as a conduit.

Second. A reduction in the necessary size of the parts incident primarily to the principle embodied in obtaining the fourth functional object above mentioned.

Third. A practical adjustment indicator for convenience in controlling the system.

In the accompanying drawings, showing one of the many and varied applications of the device:

Fig. 1 is a side elevation of the thermostat control parts complete with a diagrammatic indication of a heat treating device controlled thereby.

Fig. 2 is a central longitudinal section of the control valve for the temperature changing medium.

Fig. 3 is a plan view, and Fig. 4 a central longitudinal section of the thermometer bulb.

Fig. 5 is an enlarged detail of the joint at the end of the bulb.

In the embodiment of the invention selected for illustration, the system under control has been indicated diagrammatically as a container 10 filled with the liquid 12 to be treated, which liquid may enter through any suitable inlet device 14. Container 10 is jacketed with a larger container 16, the temperature changing element being delivered to the jacket through an inlet pipe 18 and leaving the same through an exhaust pipe 20. Assume, for the purpose of illustration, that the liquid 12 is milk and the jacket is filled with water heated by steam injected through pipe 18, the increase in volume due to condensation of the steam being relieved through pipe 20. The liquid leaves container 10 through a tubular structure indicated as a whole by the reference character 22, provided with a T connection 24 for convenience in delivering the liquid passing through the device at any time to either of the two different receiving means. The branch connection would be useful, for instance, if steam or hot water were being passed through container 10 to clean or sterilize it. It is also required by statute in many places for sanitary reasons.

According to the invention the thermometer bulb comprises a thin annular chamber 26 built into, and forming part of, the tubular structure 22. I have illustrated an outer tube 28 of steel, heavily nickel plated, as indicated at 30, and an inner tube 32, preferably of bare copper. These may be encircled first by a retaining collar 34 having an annular shoulder to engage the clamping union 36 provided with turning pins 38, and second, by a tubular member 40 defining a discharge chamber 42 communicating with the bulb through an aperture at 44, and a calibration and adjustment chamber at 46 having similar communication through orifices at 48. T 24 is suitably connected to the delivery end of the structure as by sweating it on the outer end of the tube 28 at 50. In the embodiment shown, collar 34 has been placed intermediate the ends of the bulb to shorten the distance from the tank to the discharge T. Where such compactness is not essential it would obviously be placed at the extreme end of the bulb.

Cross rings 52 at the ends of chamber 26 are integrally united with the inner and outer tubes 32 and 28 to hermetically seal the chamber. Chamber 46 contains an adjustable displacement unit in the form of a collapsible metallic bellows 54 attached at its upper end to the cross cap 56 and at its lower end to the end plate 58 carried by a stem 60 shouldered at 62 and extending through cap 56 for threaded connection with an adjustable nut 64 resting on top of the cap and held in place by a spring 66 entering corrugations 68 at its periphery. The threaded portion of the stem is flattened on one side at 69, the flat portion terminating in a shoulder 70 for a purpose to be explained hereinafter.

In some instances it is desirable to shorten the length of a structure including the thermostat by telescoping chamber 26 inside some other portion. The return flow tube indicated in dotted lines at 72 in Fig. 4 would locate the initial liquid intake to the thermostat at 73 and compel the same to move to the left outside the tube and back to the right inside the same.

It will be apparent that the initial response of the thermometer bulb shown will be produced when the tube 72 is omitted by the hot or cold liquid impinging in the first instance on the copper tube 32. The resultant expansion or contraction of this tube will force some of the contents of the chamber out or draw it into the chamber from the chamber 42, and the subsequent transfer of the new temperature condition to the liquid in the bulb will result in continued displacement in the same direction. It will be apparent that if the temperature change were effective first on tube 28 only, the above bulb would have all the defects of the ordinary bulbs of the prior art. To eliminate this and still permit the use of tube 72, I form tube 28 of heavily nickel plated steel whereby it constitutes a thermal barrier between the contents of the bulb and the liquid outside several times more effective than tube 32. This difference in conductivity combined with the lower expansivity of the outer tube results in such a time-lag in the effectiveness of the expansion or contraction of tube 28 that under all normal conditions of use the change in temperature reaches the tube 32 at least simultaneously with the effect on tube 28, so as to more than neutralize it.

The flow control means I have illustrated comprises a valve casing 74 having an outlet chamber 75 and a double inlet chamber 76 lying on both sides thereof. Valve 78 has an upper plate at 80 co-operating with the upper cylindrical seat 82 and a lower plate at 84 co-operating with the lower cylindrical seat 86 so that it is balanced and unaffected by the flow of fluid through the same. The valve is normally held up against a stop 88 by means of spring 90 housed in cap 92 and guided on suitable pins 94. Stop 88 is continued in the form of a central rod extending up to the upper head 96 of the collapsible metallic bellows 98 housed in chamber 100. That portion without the bellows being hermetically sealed from the portion inside and constituting an expansion chamber in which the displacement of rod is varied by expansion of liquid in chamber 100 and connecting chambers. A suitable small connecting tube 102 connects chamber 100 with the thermometer bulb.

The whole system is filled with a suitable liquid of proper expansivity. The lighter mineral hydrocarbon oils are suitable, but the oil should be selected to have a boiling point well above the highest temperature to which it is to be subjected. For milk pasteurizing service I find it advantageous to be able to blow live steam through the device to sterilize it, and for this work I have secured excellent results from ordinary lubricating oil, boiled to eliminate any constituents volatile below the boiling point of water.

The adjusting means of Fig. 4 is particularly designed to automatically allow extreme expansion and come back to the previous adjustment undisturbed. Chamber 46 is of sufficiently large capacity to care for any abnormal expansion, such as that occurring when a control adjusted for pasteurizing milk is sterilized with live steam. Under such circumstances, valve 77 will first close completely against the action of spring 90 until the stop point 91 on the poppet 78 comes into contact with the end of stop 94 on cap 92. This prevents the abnormal expansion from injuring bellows 98. Further expansion of the liquid in the system will lift plate 58 toward cap 56, compressing bellows 54 and spring 66 and lifting nut 64 off of cap 56. The stop spring or clip 66 is of sufficient length to remain engaged with its corrugation 68 and form a guide so that when contraction of the liquid takes place as the apparatus cools, the adjustment for thermostatic operation will remain as before and need not be made over again. The shoulder 62 on the stem 60 is far enough from cap 56 to permit any abnormal expansion of this nature.

It is a well known fact that the flow of a compressible fluid through an orifice with fixed pressures on both sides of the orifice is a linear function of the area of the orifice, but where the final pressure is more than approximately fifty-eight one-hundredths of the initial pressure, any change in pressures effects a large change in the constant of proportionality between area and flow. In a system controlled by such a valve as that shown in Fig. 2 operating with a drop in pressure through the valve less than that necessary to eliminate the effect of the final pressure, the flow as a function of the axial displacement of the valve is represented by a curve of large curvature, having a relatively straight portion at one end. By cutting down on the valve opening for normal adjustment to a point where the flow is independent of the final pressure, operation can be had over a range where the rate of flow is substantially a linear function of the displacement of rod 88. This produces two very important results. First, the linear relationship obtained makes it possible to adjust plunger 60 and calibrate the adjustment with fair precision over a considerable temperature range. Thus a machine may be initially constructed so that with the notch 70 flush with the surface of adjusting nut 64, a temperature of say 140° Fahrenheit will be maintained in the machine, and rotation of the nut in either direction will change the temperature up or down by amounts substantially directly proportioned to the extent of change in adjustment. Notch 70 is convenient to keep track of the number of turns, or to provide an indication in case the adjusting nut may have been inadvertently turned since a previous operation and should be readjusted before starting another run.

The second advantage is that the considerable decrease in the displacements of the valve, necessary to produce adequate variations in flow, correspondingly reduces the size of the thermometer bulb required and the size of the metallic bellows 98 and its housing.

In constructing a system to operate according to the method above outlined I proceed by choosing valve and pipe connections of sufficiently large calibre so that flow of the temperature changing fluid is in no way limited at the maximum demand by the pipe connections and valve passages themselves. I then elongate stem 87 so that it will come into abutment with guide 89 and operate as a positive stop with openings 83 and 85 cut down to a point at which the amount of fluid for maximum capacity will not be much exceeded. This still leaves the ports 83 and 85 substantially the only agency limiting the flow, the parts being otherwise designed and apportioned to the demands of the system so that at the widest opening, the pressure drop through the ports will still be sufficient to maintain the flow substantially independent of the pressure after the fluid passes through the ports. It will be obvious that the method above outlined could be practiced with any one of a large number of different types of valves as effectively as with the valve illustrated.

In the usual thermometer bulb with the filling in the form of a geometrically solid mass, where a considerable amount of liquid is contained in the bulb, convection currents are essential to a comparatively quick response. It is, therefore, advisable to install such a bulb in a horizontal position, because if it is vertical rising currents follow the surface of the bulb to its top without mixing with contiguous liquid, and differences in temperature must be communicated to the core of the liquid by conductivity only. In most liquids, and especially in the liquids employed for this purpose, conductivity is low and a response depending on such action is very slow.

In the thin annular chamber 26 all of the expansive liquid is practically contiguous to the heat transmitting medium, and the response to change in temperature is very rapid on account of the large amount of surface exposed compared with the volume of the bulb. The bulb functions practically the same in any position.

Without further elaboration, the foregoing will so fully explain the gist of my invention, that others may, by applying current knowledge, readily adapt the same for use under various conditions of service. It will, for instance, be obvious, that if either a liquid or a solid material having a negative coefficient of expansion, and sufficiently stable in its action for thermometric work, were available, it would be necessary to change back to the ordinary form of bulb to obtain an initial response in the same direction as the permanent response. These and many other modifications and alterations may readily be made by those skilled in the art without eliminating certain features which may properly be said to constitute the essential items of novelty involved, which items are intended to be defined and secured to me by the following claims.

I claim:

1. A thermometer comprising a bulb in the form of a tubular chamber exposed on the outside and the inside of the tube to the temperature to be measured, said chamber having an outer wall of lower expansivity and thermal conductivity than the inner wall, and means for passing material to be observed as to temperature, first over the outside and then through the inside of said bulb.

2. A thermometer comprising a bulb in the form of a tubular chamber exposed on the outside and the inside to the temperature to be measured, said chamber having an outer wall of lower expansivity and thermal conductivity than the inner wall.

3. A thermometer comprising a bulb in the form of a tubular chamber exposed on the outside and the inside to the temperature to be measured, said chamber having an outer wall of lower expansivity than the inner wall.

4. A thermometer bulb comprising an inner tube of copper, an outer tube of steel heavily nickel plated and telescoped over said inner tube to define a thin annular chamber, rings at the ends of said tubes hermetically sealing said chamber, a sleeve hermetically sealed at its end to the outside of said outer tube and enlarged intermediate its ends to define a storage chamber, a hermetically sealed body of variable volume in said chamber, and external means for varying the volume of said body, said outer tube having ports opening into said chamber.

5. A thermometer bulb comprising an inner tube, an outer tube telescoped over said inner tube to define a thin annular chamber, and rings at the ends of said tubes hermetically sealing said chamber, said outer tube being of lower expansivity than said inner tube.

6. A thermometer bulb comprising an inner tube of copper, an outer tube of steel heavily nickel plated and telescoped over said inner tube to define a thin annular chamber, and rings at the ends of said tubes hermetically sealing said chamber.

7. A thermometer bulb comprising an inner tube of relatively thin material possessing a high degree of heat conductivity and a high co-efficient of expansion, an outer tube telescoped over said inner tube having a relatively low co-efficient of expansion, a covering for the outer tube of relatively low thermal conductivity compared with said inner tube, means for sealing the space between the tubes to define a thin tubular chamber, and fluid within the tube responsive to changes in temperature.

8. A thermometer bulb comprising an inner tube of relatively thin material possessing a high degree of heat conductivity, an outer tube telescoped over said inner tube, a covering for the outer tube of relatively low thermal conductivity compared with said inner tube, means for sealing the space between the tubes to define a thin tubular chamber, and fluid within said chamber responsive to changes in temperature.

In witness whereof, I hereunto subscribe my name this 26th day of January, 1925.

BYRON J. PEPPER.